United States Patent
Eastham et al.

(10) Patent No.: US 8,588,420 B2
(45) Date of Patent: Nov. 19, 2013

(54) SYSTEMS AND METHODS FOR DETERMINING A TIME DELAY FOR SENDING A KEY UPDATE REQUEST

(75) Inventors: W. Bryant Eastham, Draper, UT (US); James L. Simister, Pleasant Grove, UT (US)

(73) Assignee: Panasonic Corporation, Osaka (JP)

( * ) Notice: Subject to any disclaimer, the term of this patent is extended or adjusted under 35 U.S.C. 154(b) by 1614 days.

(21) Appl. No.: 11/624,551

(22) Filed: Jan. 18, 2007

(65) Prior Publication Data
US 2008/0178003 A1    Jul. 24, 2008

(51) Int. Cl.
*H04L 9/08* (2006.01)
(52) U.S. Cl.
USPC ........... 380/277; 380/278; 380/279; 380/281; 380/284; 713/171; 718/105
(58) Field of Classification Search
USPC ............ 380/27, 281, 284, 277–279; 718/105; 713/171
See application file for complete search history.

(56) References Cited

U.S. PATENT DOCUMENTS

| | | | |
|---|---|---|---|
| 5,224,163 A | 6/1993 | Gasser et al. | |
| 5,369,705 A | 11/1994 | Bird et al. | |
| 5,371,794 A | 12/1994 | Diffie et al. | |
| 5,491,750 A | 2/1996 | Bellare et al. | |
| 5,778,065 A | 7/1998 | Hauser et al. | |
| 6,782,103 B1 * | 8/2004 | Arthan et al. | 380/278 |
| 7,062,556 B1 * | 6/2006 | Chen et al. | 709/226 |
| 7,123,719 B2 * | 10/2006 | Sowa et al. | 380/247 |
| 8,099,388 B2 * | 1/2012 | Shen et al. | 707/636 |
| 2002/0146131 A1 * | 10/2002 | Onagawa | 380/277 |
| 2002/0154781 A1 * | 10/2002 | Sowa et al. | 380/278 |
| 2002/0170053 A1 * | 11/2002 | Peterka et al. | 725/31 |
| 2004/0136533 A1 * | 7/2004 | Takagaki et al. | 380/255 |
| 2006/0193473 A1 * | 8/2006 | Fu | 380/277 |
| 2007/0253376 A1 * | 11/2007 | Bonta et al. | 370/338 |
| 2008/0098226 A1 * | 4/2008 | Zokumasui | 713/171 |

OTHER PUBLICATIONS

Yair Amir, Yongdae Kim, Cristina Nita-Rotaru, Gene Tsudik. "On the Performance of Group Key Agreement Protocols" ©2004 ACM Transactions on Information and System Security, vol. 7, No. 3, Aug. 2004 (pp. 457-488).*

* cited by examiner

*Primary Examiner* — Hosuk Song
*Assistant Examiner* — Thomas Gyorfi
(74) *Attorney, Agent, or Firm* — Austin Rapp & Hardman (57) ABSTRACT

A method for determining a time delay for sending an update request by a computing device is described. A first update request is sent by a computing device at the termination of a first random delay. A first load data is received. A second update request is sent by the computing device at the termination of a maximum update parameter. A second load data is received. The first load data is compared with the second load data. A next update time is adjusted if the first load data differs from the second load data.

21 Claims, 8 Drawing Sheets

SYSTEMS AND METHODS FOR DETERMINING A TIME DELAY FOR SENDING A KEY UPDATE REQUEST

TECHNICAL FIELD

The present invention relates generally to computers and computer-related technology. More specifically, the present invention relates to systems and methods for determining a time delay for sending a key update request.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded devices or embedded systems. (The terms "embedded device" and "embedded system" will be used interchangeably herein.) An embedded system usually refers to computer hardware and software that is part of a larger system. Embedded systems may not have typical input and output devices such as a keyboard, mouse, and/or monitor. Usually, at the heart of each embedded system is one or more processor(s).

Embedded systems may be used to monitor or control many different systems, resources, products, etc. With the growth of the Internet and the World Wide Web, embedded systems are increasingly connected to the Internet so that they can be remotely monitored and/or controlled. Other embedded systems may be connected to computer networks including local area networks, wide area networks, etc. As used herein, the term "computer network" (or simply "network") refers to any system in which a series of nodes are interconnected by a communications path. The term "node" refers to any device that may be connected as part of a computer network.

Some embedded systems may provide data and/or services to other computing devices using a computer network. Alternatively, there may be typical computers or computing devices that provide data and/or services to other computing devices using a computer network. Sometimes it is beneficial to minimize the number of key updates required to maintain secure connections. Using large numbers of key updates can cause additional traffic over the network. These situations, as well as others, may cause inefficiencies in communication across the network. Benefits may be realized if systems and methods were available for determining a time delay for sending a key update request.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

A method for determining a time delay for sending a key update request by a computing device is described. A first update request is sent by a computing device at the termination of a first random delay. A first load data is received. A second update request is sent by the computing device at the termination of a maximum update parameter. A second load data is received. The first load data is compared with the second load data. A next update time is adjusted if the first load data differs from the second load data.

The maximum update parameter may comprise a different delay than the first random delay if the first load data is different from the second load data. The first random delay may comprise a time delay indicating the time to wait before sending the first update request. An authentication request is sent to an authentication server.

In one embodiment, an authentication key is received from the authentication server. The authentication key may comprise a key exchange key (KEK). The first update request and the second update request may comprise a request for changes to the KEK. The maximum update parameter may comprise the maximum amount of time a node waits before sending the second update request. The first update request may comprise a time unit that is less than the time indicated by the maximum update parameter. The first load data and the second load data may comprise parameters that indicate the load the authenticating server was under for previous time units.

A computing device that is configured to determine a time delay for sending a key update request is also described. The computer system comprises a processor and memory in electronic communication with the processor. Instructions are stored in the memory. A first update request is sent at the termination of a first random delay. A first load data is received. A second update request is sent at the termination of a maximum update parameter. A second load data is received. The first load data is compared with the second load data. A next update time is adjusted if the first load data differs from the second load data.

A computer-readable medium comprising executable instructions for determining a time delay for sending a key update request is also described. A first update request is sent at the termination of a first random delay. A first load data is received. A second update request is sent at the termination of a maximum update parameter. A second load data is received. The first load data is compared with the second load data. A next update time is adjusted if the first load data differs from the second load data.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In a secure multicast group, the group may manage a group key for encrypting and decrypting information that is multicast between the members of the group. In one embodiment, a centralized server, such as an authentication server, is used to control the membership of the group. A key exchange key (KEK) may be distributed from the centralized server to a node desiring to join the group. The KEK may allow the node to communicate with the nodes in the group in order to obtain the group key.

In some embodiments, the KEK may change when a node has been removed from the group. The authentication server may assume that the removed node remembers the old KEK and could use it to rejoin the group illegally. This implies that the changed KEK may be securely distributed to each existing group member.

In one embodiment, the centralized server may not possess the capability to multicast the changes to the KEK to the group members. As such, each group member may periodically check with the server to ensure that the KEK has not changed, or to obtain the new KEK if changes have occurred. For example, the group members may send update requests to the server. It may be desirable that the load on the server caused by the multiple update requests is distributed over time so the server has even loading.

A set of parameters indicating past loads the server was under for previous time units may be used to facilitate an even distribution of the load when update requests are sent to the server in the future. These parameters may be distributed to a node each time the node sends an update request. The server may differentiate between the load caused by normal update requests and the load caused by accelerated update requests due to KEK changes. The load caused by accelerated update requests may skew the averages of past loads indicated by the set of parameters.

Data representing past loads on the server during previous time units may assist the node to select an initial random choice of the time to send an update request, but the previous time units that the parameters cover may not extend over enough time to be of beneficial use. For example, a maximum request period for nodes belonging to a particular group may include twenty-four hours. This may imply that each node queries the server for changes to the KEK once every twenty-four hours. Sufficient detailed information may not be available to predict when, during the next twenty-four hours, would be an efficient time for a particular node to send the update request so that the load on the server is evenly distributed. Maintaining such detailed load data information may require large amounts of memory and computing capabilities by the server.

Figure 1:
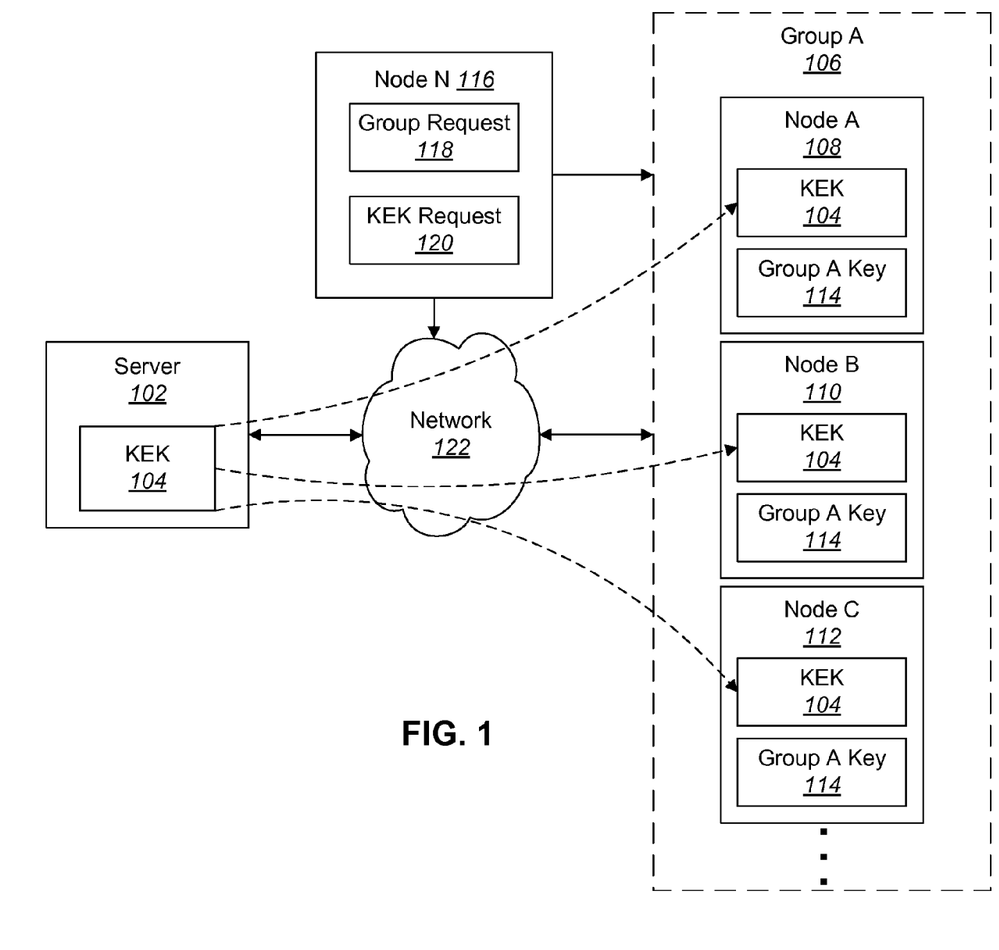
FIG. 1 is a block diagram illustrating one embodiment of a server communicating a key exchange key (KEK) to one or more nodes within a group.

FIG. 1 is a block diagram illustrating one embodiment of a server 102 communicating a key exchange key (KEK) 104 to one or more nodes within group A 106. In one embodiment, the server 102 is an authentication server. An authentication server may be a server that authenticates nodes desiring to join group A 106. In one embodiment, the server 102 authenticates a node and the node receives the KEK 104. A node may join group A 106 by using the KEK 104 to verify its ability to join the group A 106 to the other nodes belonging to group A 106. In one embodiment, the server 102 maintains a minimal state regarding each node of group A 106. For example, the server 102 may simply maintain the state of the KEK 104. The server 102 may communicate changes to the KEK 104 to the nodes of group A 106.

As illustrated, group A 106 includes node A 108, node B 110 and node C 112. While group A 106 is illustrated with only three nodes, it is to be understood that group A 106 may include more or less nodes. Group A 106 may be referred to as a secure multicast group because nodes within group A 106 may multicast information to each other in a secure manner. For example, information that is multicast between the nodes of group A 106 may be encrypted with a shared group A key 114. The nodes may use the KEK 104 to receive the group A key 114 that is associated with group A 106. For example, node N 116 may request to become a member of group A 106 by sending a group request 118 to one or more nodes of group A 106. The one or more nodes of group A 106 may determine if node N 116 includes the KEK 104. If node N 116 includes the KEK 104, the one or more nodes may distribute the group A key 114 to node N 116. The group A key 114 may enable a node to send information to and receive information from other nodes within group A 106. Nodes may use the group A key 114 to encrypt or decrypt information that is communicated between the nodes of group A 106.

If node N 116 does not possess the KEK 104, node N 116 may send a KEK request 120 to the server 102, requesting that the server 102 distribute the KEK 104 to node N 116. The server 102 may authenticate node N 116 and distribute the KEK 104. However, if the KEK 104 is not distributed to node N 116, node N 116 may not join group A 106 and receive the group A key 114.

Communications between the server 102, group A 106 and node N 116 may be over a network 122. The network 122 may include any communications network, such as, but not limited to, a global communications network, the Internet, a computer network, a telephone network, a pager network, a cellular network, a wide-area network (WAN), a local-area network (LAN), etc. In one embodiment, the server 102 may manage and communicate with multiple groups of nodes over the network 122. The server 102 may distribute a KEK that is specific to each group of nodes.

Figure 2:
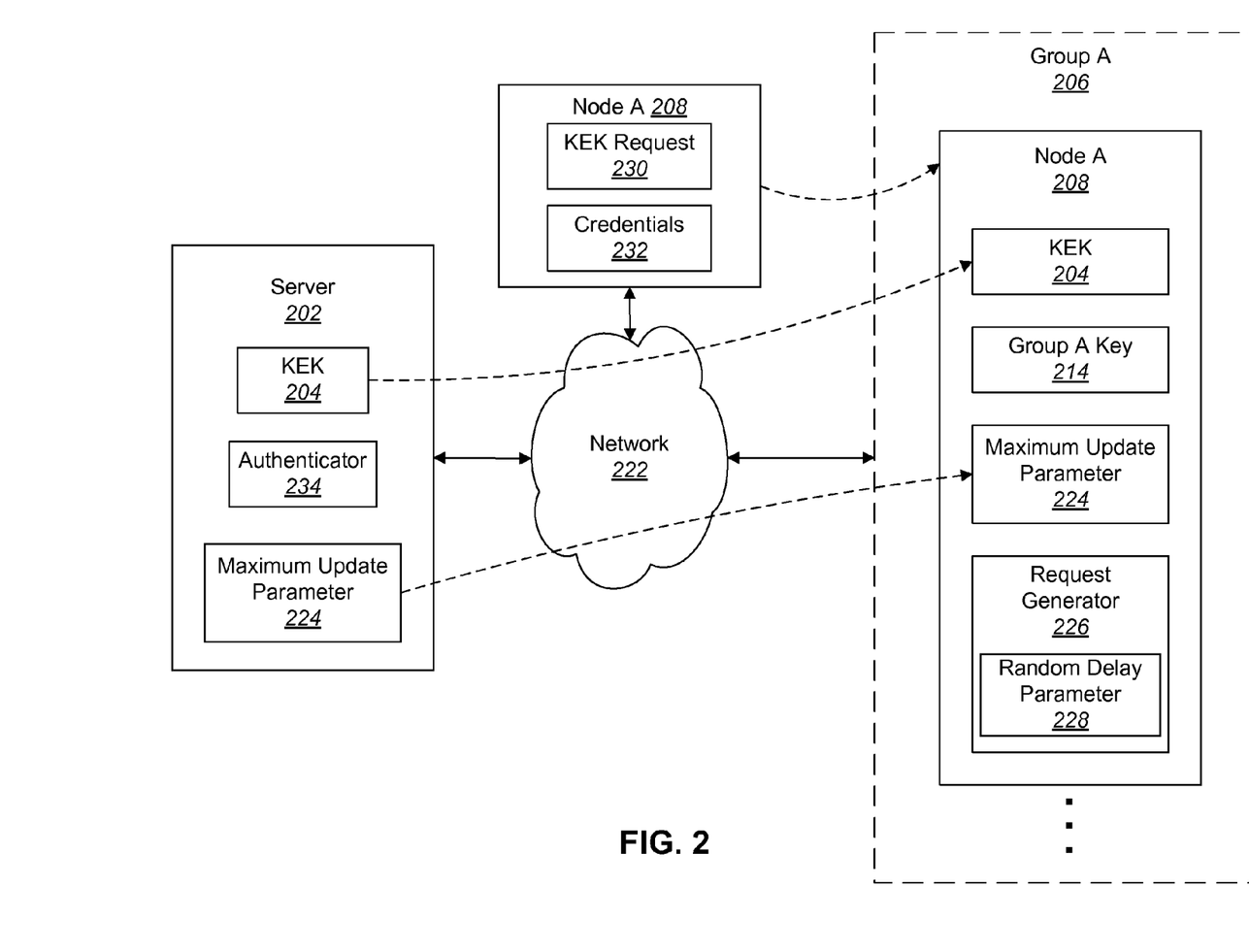
FIG. 2 is a block diagram illustrating one embodiment of the server authenticating a node.

FIG. 2 is a block diagram illustrating one embodiment of a server 202 authenticating node A 208. In one embodiment, node A 208 is authenticated before being allowed to join group A 206. Node A 208 may communicate a KEK request 230 to the server 202 over a network 222 connection. The KEK request 230 may include a request for the server 202 to distribute the KEK 204 associated with group A 206. Node A 208 may know whether or not it is joining group A 206 for the first time or simply querying the server 202 for changes to the KEK 204.

In one embodiment, the server 202 receives credentials 232 associated with node A 208. An authenticator 234 may evaluate the credentials 232 and determine if node A 208 possesses the appropriate credentials to join group A 206. The credentials 232 may include information regarding node A 208 such as the Internet Protocol (IP) address, the media access control (MAC) address, computing capabilities, knowledge of a shared secret, etc. If the authenticator 234 authenticates node A 208, the server 202 distributes the KEK 204 to node A 208. As previously explained, the KEK 204 may allow node A 208 to receive a group A key 214. The group A key 214 may allow node A 208 to multicast information to other nodes in group A 206. In addition, the group A key 214 may allow node A 208 to receive information from other nodes in group A 206. For example, the group A key 214 may be used by members of group A 206 to encrypt and decrypt information that is multicast to the members of group A 206.

Node A 208 may also include a request generator 226 that generates update requests to be sent to the server 202. The update requests may query the server 202 for changes to the KEK 204. In one embodiment, the server 202 is modified in such a way that a node can no longer obtain the KEK 204 associated with group A 206. For example, the node may have become compromised and the server 202 modified in order to prevent the compromised node from compromising the integrity of group A 206. When the server 202 is modified as described, it may change the KEK 204. The server 202 may not distribute the new, changed KEK to the compromised node because an authenticator 234 would now fail to authenticate the compromised node. As such, the compromised node may not receive the new, changed KEK, which may prevent the compromised node from subsequently receiving the group A key 214. Without the group A key 214, the corrupted node is prevented from multicasting information to or receiving information from the nodes still belonging to group A 206. In one embodiment, the compromised node is unable to encrypt or decrypt information that is multicast between the members of the group A 206 without the group A key 214. If the KEK 204 was not changed after the removal of a compromised node, the compromised node may reuse the KEK 204 to receive the group A key 214 and illegally rejoin (or maintain membership in) group A 206.

In one embodiment, the server 202 includes a maximum update parameter 224. The maximum update parameter 224 may be specific to group A 206. The parameter 224 may indicate the maximum amount of time that nodes in group A 206 may trust the KEK 204 without sending update requests to the server 202 to check for changes to the KEK 204. For example, the maximum update parameter 224 may indicate twenty-four hours which suggests that each node within group A 206 sends an update request to the server 202 once every twenty-four hours. In one embodiment, the maximum update parameter 224 is distributed to a node when the node is first authenticated, receives the KEK 204 and joins the group A 206. In another embodiment, the maximum update parameter 224 is distributed to a node each time the node checks for an updated KEK 204.

The request generator 226 may include a random delay parameter 228 which randomly selects a time for the generator 226 to generate and send the first update request to the server 202 after a node has joined a group. The random delay parameter 228 may randomly select a delay that is less than the maximum update parameter 224. For example, the maximum update parameter 224 may include twenty-four hours. The random delay parameter 228 may select sixty minutes. In one embodiment, the request generator 226 generates the first update request sixty minutes after node A 208 is authenticated and receives the KEK 204. The request generator 226 may then generate and send a subsequent update request twenty-four hours after generating and sending the first update request to the server 202. In one embodiment, the random delay parameter 228 decreases the load that may be placed on the server 202 from receiving multiple update requests at the same time from multiple nodes.

In one embodiment, the random time delay selected to send the first update request may serve as a first order randomizer, which implies that there is no feedback on whether the determination of when to send the first update request was efficient or not. Once the initial random time delay has expired, update requests may be sent after the expiration of the maximum update parameter 224.

Figure 3:
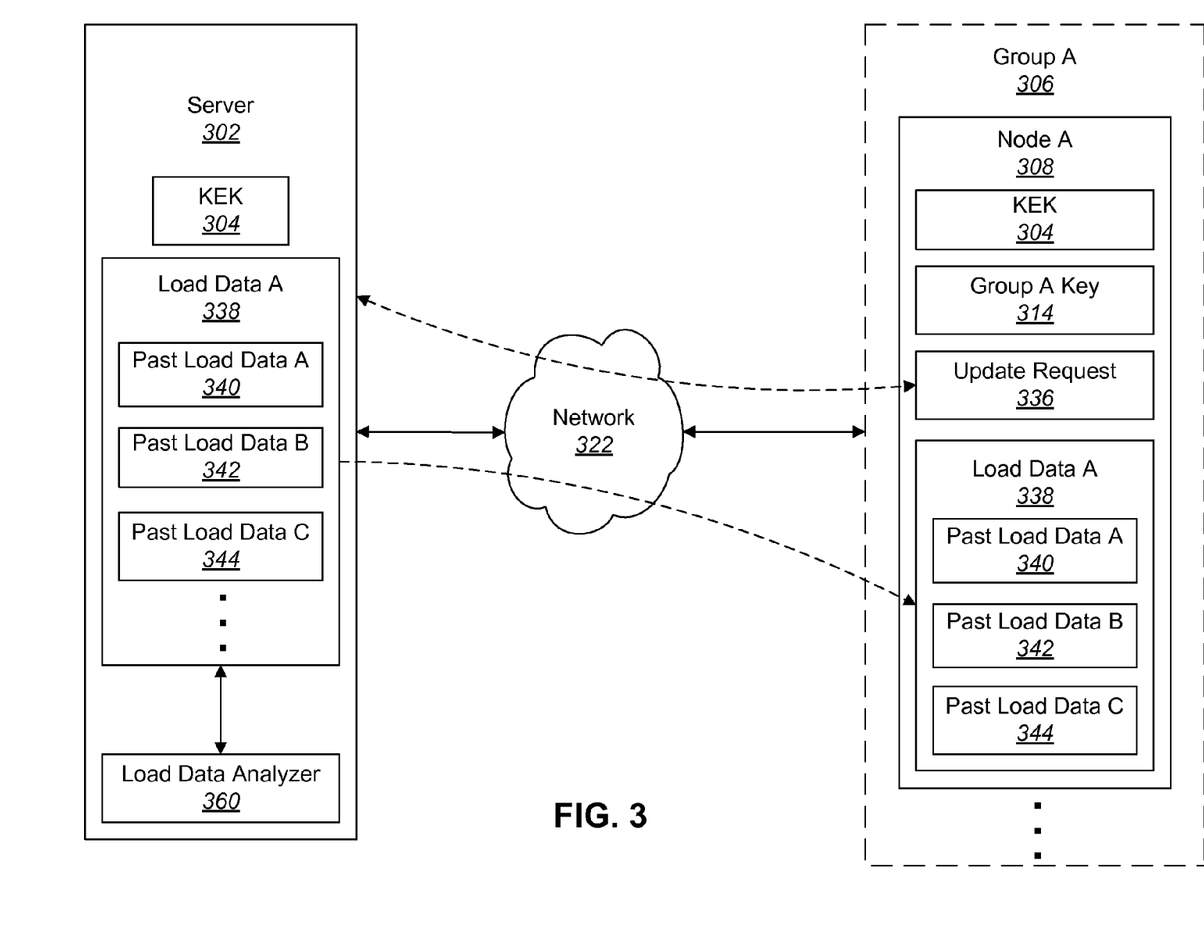
FIG. 3 is a block diagram illustrating one embodiment of a node receiving load data relating to the load on the server at various times.

FIG. 3 is a block diagram illustrating one embodiment of a node receiving load data relating to the load on a server 302 at various times. In one embodiment, node A 308 is authenticated, receives a KEK 304 and becomes a member of group A 306. Node A 308 may use the KEK 304 to receive a group A key 314. Node A 308 may send an update request 336 to the server 302 to check if the KEK 304 has changed. In one embodiment, the update request 336 is sent to the server 302 over a network 322 connection.

The server 302 may send load data A 338 to node A 308 when the server 302 receives the update request 336. In another embodiment, the load data A 338 may also be sent from the server 302 when the server 302 receives the initial KEK request 230. Load data A 338 may indicate past loads that the server 302 was under for previous time units. For example, load data A 338 may include past load data A 340, past load data B 342, past load data C 344, etc. Past load data A 340 may represent the load the server 302 was under for the previous thirty seconds. Past load data B 342 may represent the load the server 302 was under for the previous five minutes. Similarly, past load data C 344 may represent the load the server 302 was under for the previous thirty minutes. These parameters representing past loads are merely examples and it is to be understood that the present systems and methods may include data representing any number of past loads the server 302 was under during any previous time unit.

In one embodiment, the server 302 includes a load data analyzer 360. The analyzer 360 may determine if the load on the server 302 is caused by normal update requests 336 or if the load is caused by accelerated update requests 336. In one embodiment, normal update requests 336 are sent periodically to check if the KEK 304 has changed. In a further embodiment, accelerated update requests 336 are sent to the server 302 in a short time period because the KEK 304 has changed. The analyzer 360 may communicate these different types of load to load data A 338.

Figure 4:
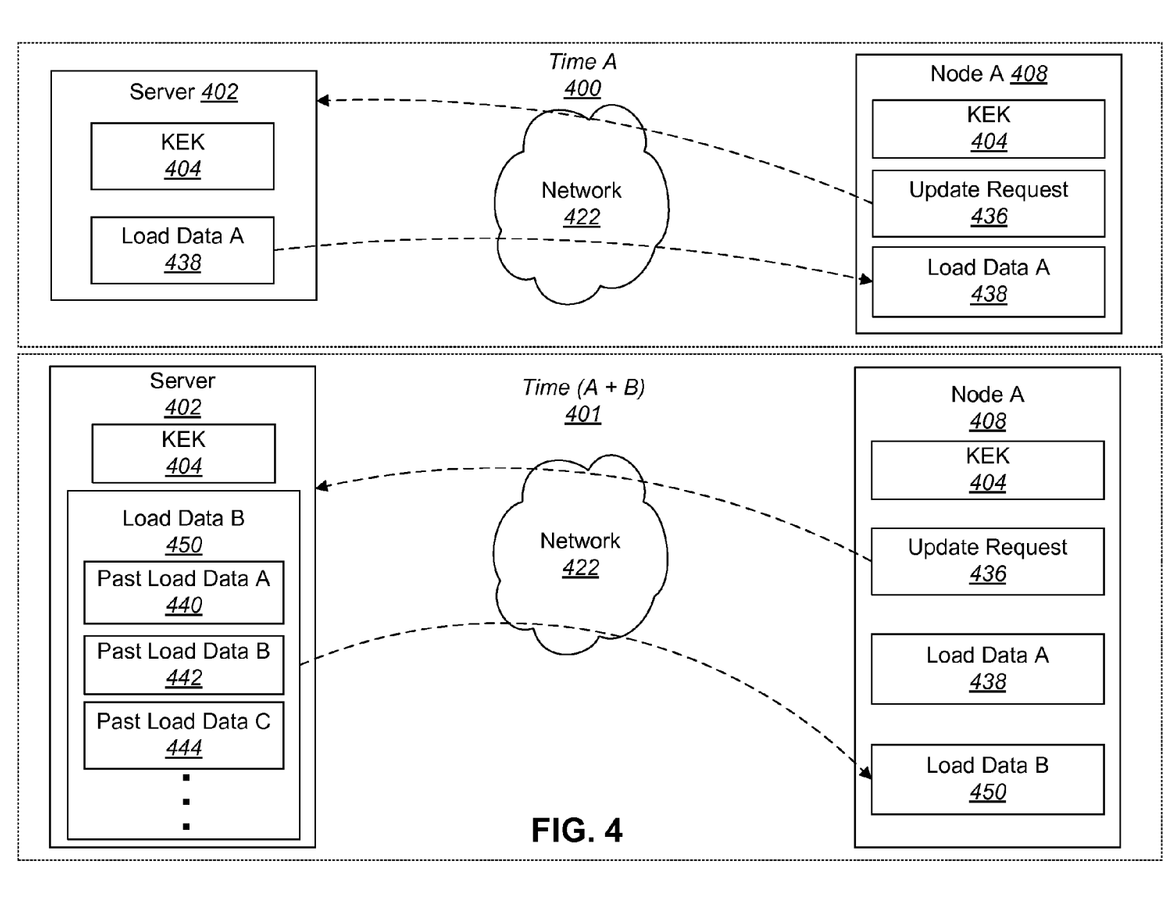
FIG. 4 is a block diagram illustrating one embodiment of the server sending load data to a node at different time intervals.

FIG. 4 is a block diagram illustrating one embodiment of a server 402 sending load data to a node at different time intervals. In one embodiment, node A 408 may send an update request 436 to the server 402 at time A 400. Time A 400 may represent the expiration of the random delay parameter 228. Node A 408 may send an additional update request 436 at time (A+B) 401. Time (A+B) 401 may represent the expiration of the maximum update parameter 224 plus the expiration of the random delay parameter 228. For example, the maximum update parameter 224 may include a parameter of twenty-four hours which indicates that node A 408 may trust the KEK 404 for twenty-four hours before sending an update request 436. In order to reduce load on the server 402, each node within a group may randomly selects a time, which is less than the maximum update parameter 224, to send the first update request 436. Node A 408 may randomly select the time of sixty minutes to send the first update request 436. In one embodiment, node A 408 sends the first update request 436 sixty minutes after receiving the KEK 404. In the depicted embodiment, time A 400 may represent sixty minutes. After sending the first update request 436, node A 408 may wait until the expiration of the time specified by the maximum update parameter 224 to send an additional update request 436. In this example, node A 408 may wait twenty-four hours before sending another update request 436. In the depicted embodiment, time (A+B) 401 may represent twenty-five hours, where time A represents sixty minutes and time B represents twenty-four hours.

In one embodiment, the server 402 sends load data A 438 to node A 408 when the server 402 receives the first update request 436 at time A 400. As previously explained, load data A 438 may include sets of parameters that indicate the load the server 402 was under for some number of previous time units (i.e., thirty seconds, five minutes, thirty minutes, etc.) In one embodiment, node A 408 sends an additional update request 436 at time (A+B) 401. The server 402 may send load data B 450 to node A 408. Load data B 450 may include past load data A 440, past load data B 442, past load data C 444, etc. Past load data A 440, past load data B 442 and past load data C 444 may represent parameters that indicate the load the server 402 experienced during previous time units. In one embodiment, node A 408 compares load data A 438 with load data B 450. Node A 408 may adjust the time for sending the future update requests 436 based on the comparison of the load histories. For example, if the comparison of load data B 450 and load data A 438 indicates that the load on the server 402 is higher in the most recent previous time unit before the time when the additional update request 436 was sent, but the same comparison shows that the load is similar for an even earlier time unit, node A 408 may shift to an earlier time to send subsequent update requests 436. In other words, node A 408 may send the next update request 436 slightly before the expiration of the time indicated by maximum update parameter 224. In another embodiment, node A 408 may evaluate the load the server 402 was under during the most recent update request to determine if the time to send subsequent update requests 436 should be modified at all.

Figure 5:
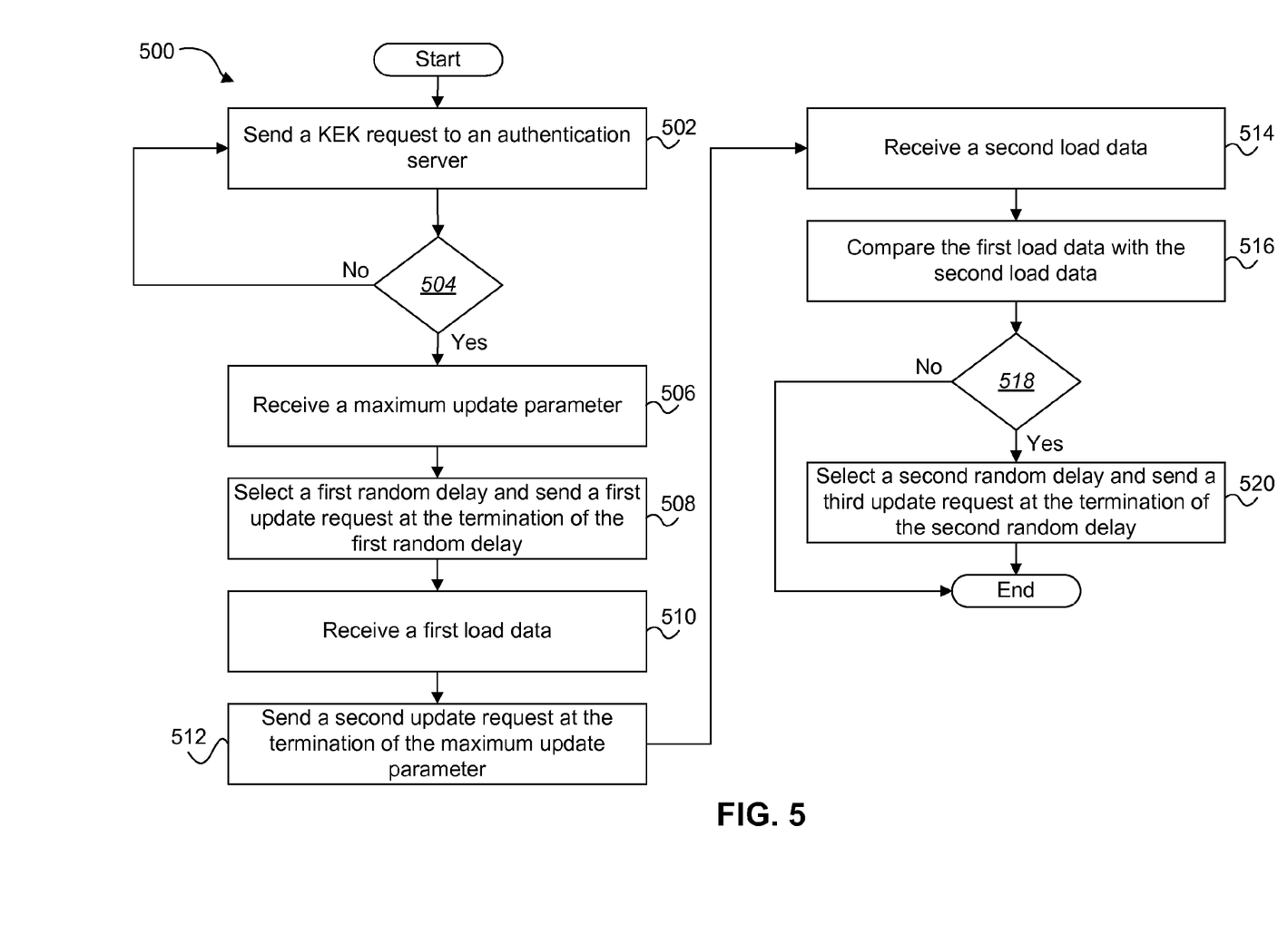
FIG. 5 is a flow diagram illustrating one embodiment of a method for determining whether to change a time delay for sending update requests.

FIG. 5 is a flow diagram illustrating one embodiment of a method 500 for determining whether to change a time delay for sending update requests. The method 500 may be implemented by a node, such as node A 108. A KEK request is sent 502 to an authentication server. In one embodiment, the KEK request is sent by a node that desires to receive a group key associated with a group of nodes. In one embodiment, the node that sent 502 the KEK request may also send credentials to the authentication server. If it is determined 504 that the node does not possess the appropriate credentials, the node is not authenticated and at a later time, a KEK request may again be sent 502 to the server. If it is determined 504 that the node does possess the appropriate credentials, the node is authenticated and receives the KEK 104. In one embodiment, a maximum update parameter is also received 506. As previously explained, the maximum update parameter may indicate the maximum amount of time a node may trust the KEK 104 before sending an update request for possible changes to the KEK 104. In a further embodiment, load data A 338 is also received 506. As previously explained, the load data may indicate the load of the server during previous time periods.

A first random delay may be selected 508 and a first update request may be sent at the termination of the first random delay. The first random delay may be less than the maximum update parameter. In one embodiment, a first load data is received 510. The first load data may include parameters that indicate the load the authentication server was under for previous time units (i.e., thirty seconds, five minutes, thirty minutes, etc.) A second update request may be sent 512 at the termination of the time indicated by the maximum update parameter. In one embodiment, a second load data is received 514. The second load data may also include parameters that indicate the load the authentication server was under for previous time units. The first load data may be compared 516 with the second load data. A determination 518 is made whether the load on the authentication server during the second update request is different than the load on the server during the first update request by comparing 516 the first and second load data. If it is determined 518 that there is little or no difference in the first load data and the second load data, the method 500 ends. If it is determined 518 that there is a difference between the first load data and the second load data, a second random delay is selected 520 and a third update response is sent at the termination of the second random delay. In one embodiment, the second random delay is different than the first random delay. In general, the same comparison 518 may be done between any two sets of load data received to adjust 520 the delay between update requests.

Figure 6:
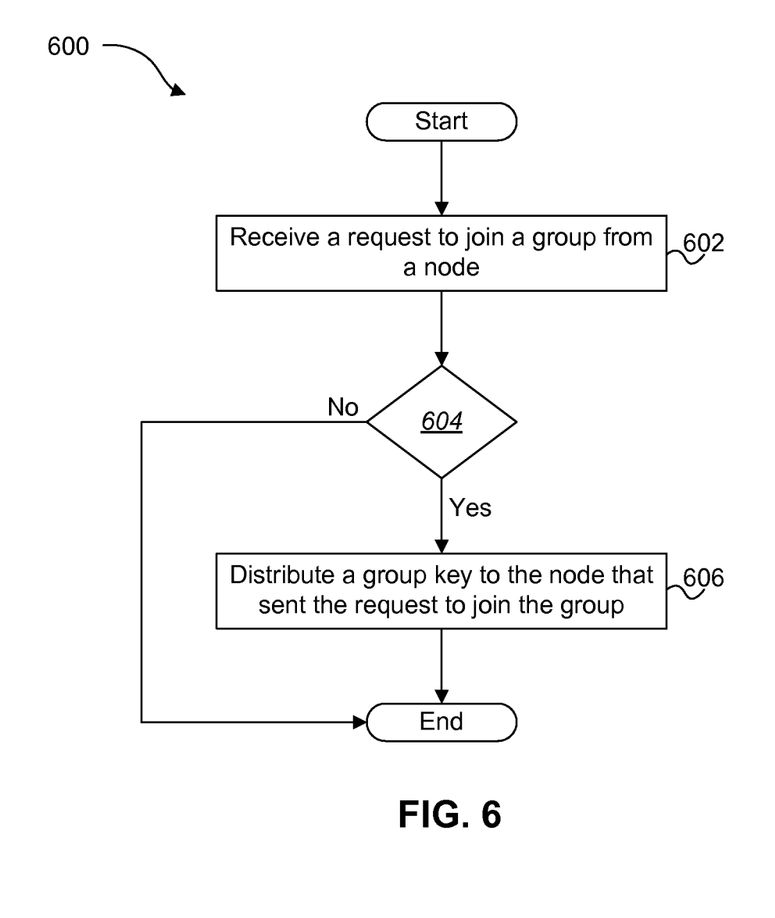
FIG. 6 is a flow diagram illustrating one embodiment of a method for determining whether a node may join a pre-existing group of nodes.

FIG. 6 is a flow diagram illustrating one embodiment of a method 600 for determining whether a node may join a group of nodes. In one embodiment, the method 600 may be implemented by an individual node belonging to the group. A request to join the group of nodes may be received 602. The request may include a parameter based on a KEK. A determination is made whether the parameter included with the request is based on 604 the KEK 104 associated with each node within the group. For example, node A 108, a member of group A 106, may receive 602 a request from node N 116 to allow node N 116 to become a member of group A 106. The request may include a parameter based on a KEK. Node A 108 may determine 604 if the parameter included with the request is based on the KEK 104 associated with node A 108. If the parameter included with the request is not based on the KEK 104 associated with node A 108, the method 600 ends. If a determination 604 is made that the KEKs match, a group key is distributed 606 to the node that sent the request. In one embodiment, the group key allows a node to receive multicasts from other nodes belonging to the group. The group key may also allow a node to multicast data to the other nodes in the group.

Figure 7:
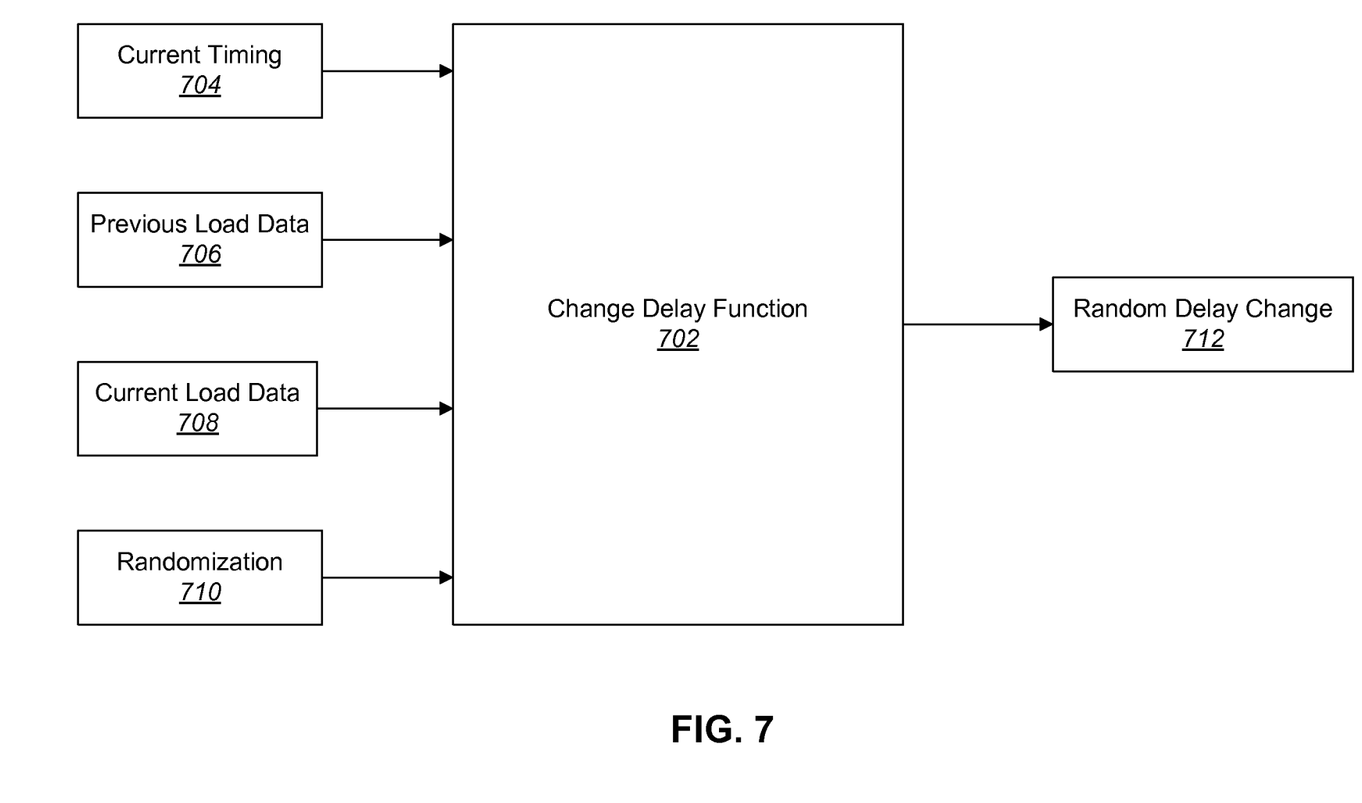
FIG. 7 is a block diagram illustrating one embodiment of a change delay function.

FIG. 7 is a block diagram illustrating one embodiment of a change delay function 702. The change delay function 702 may be used to determine the amount of change in time for when a node sends an update request to a server 102. For example, if a node compares load data and determines that the load data differs sufficiently, the node may adjust the time that subsequent update requests are sent to the server 102. In one embodiment, the change delay function 702 includes as input current timing 704, which may represent the current time parameter utilized by the node to send the update requests. For example, the current timing 704 may include the maximum update parameter 224 as previously discussed.

The change delay function 702 may also include as input previous load data 706. The previous load data 706 may represent the load on the server 102 when a previous update request was received. For example, the previous load data 706 may include load data A 338 as previously explained. In addition, the change delay function 702 may include as input current load data 708 which may represent the load on the server 102 when a current update request was received. For example, the current load data 708 may include load data B 450 as previously discussed. In one embodiment, the change delay function 702 may also receive as input a randomization parameter 710. The randomization parameter 710 enables the change delay function 702 to randomly select a change in the time that the update requests are sent to the server 102. The change delay function 702 may prevent all of the nodes within a group from changing the time to send the update requests in the same manner. The function 702 may incorporate the inputs as previously explained and output a random delay change 712. The random delay change 712 may cause subsequent update requests to be sent to the server 102 before the expiration of the maximum update parameter 224. The change delay function 702 may enable the load on the server 102 to be relatively constant, with the nodes in a group sending update requests more or less equally spaced over time.

Figure 8:
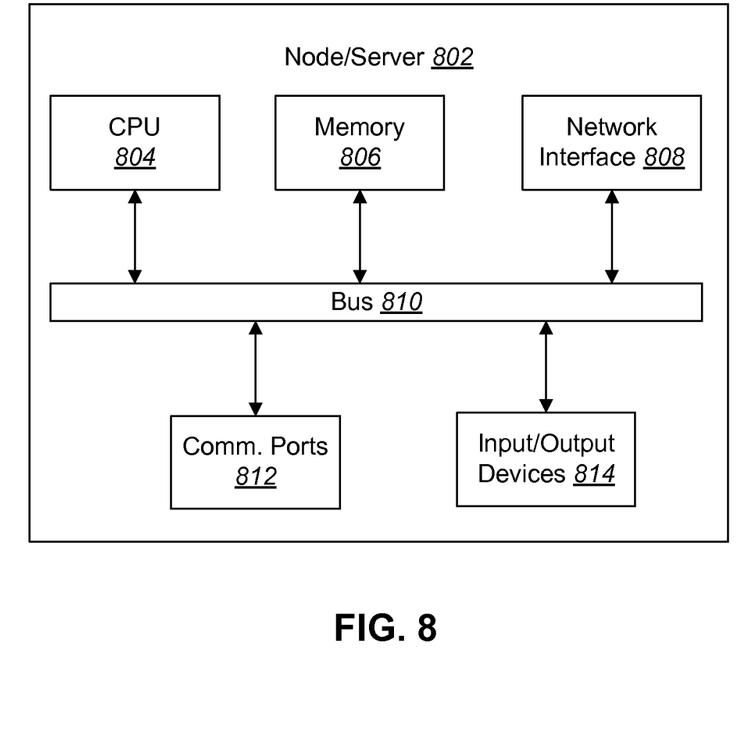
FIG. 8 is a block diagram of hardware components that may be used in an embedded device that is configured according to an embodiment.

FIG. 8 is a block diagram of hardware components that may be used in an embedded device (a node or server) 802 that is configured according to an embodiment. The embedded device, node, or server may be computing devices, as broadly defined by the block diagram of FIG. 8. A central processing unit (CPU) 804 or processor may be provided to control the operation of the embedded device 802, including the other components thereof, which are coupled to the CPU 804 via a bus 810. The CPU 804 may be embodied as a microprocessor, microcontroller, digital signal processor or other device known in the art. The CPU 804 performs logical and arithmetic operations based on program code stored within the memory. In certain embodiments, the memory 806 may be on-board memory included with the CPU 804. For example, microcontrollers often include a certain amount of on-board memory.

The embedded device 802 may also include a network interface 808. The network interface 808 facilitates communication between the embedded device 802 and other devices connected to the network 130, which may be a pager network, a cellular network, a global communications network, the Internet, a computer network, a telephone network, etc. The network interface 808 operates according to standard protocols for the applicable network 130.

The embedded device 802 may also include memory 806. The memory 806 may include random access memory (RAM) for storing temporary data. Alternatively, or in addition, the memory 806 may include read-only memory (ROM) for storing more permanent data, such as fixed code and configuration data. The memory 806 may also be embodied as a magnetic storage device, such as a hard disk drive. The memory 806 may be any type of electronic device capable of storing electronic information.

The embedded device 802 may also include one or more communication ports 812, which facilitate communication with other devices. The embedded device 802 may also include input/output devices 814, such as a keyboard, a mouse, a joystick, a touchscreen, a monitor, speakers, a printer, etc.

Of course, FIG. 8 illustrates only one possible configuration of an embedded device 802. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for determining a time delay for sending a key update request by a computing device, the method comprising:
   sending a first update request by a computing device at the termination of a first random delay that is determined at the computing device;
   receiving a first load data at the computing device;
   sending a second update request by the computing device at the termination of a maximum update parameter;
   receiving a second load data at the computing device;
   comparing the first load data with the second load data; and
   adjusting a next update time if the first load data differs from the second load data.

2. The method of claim 1, wherein the maximum update parameter comprises a different delay than the first random delay if the first load data is different from the second load data.

3. The method of claim 1, wherein the first random delay comprises a time delay indicating the time to wait before sending the first update request.

4. The method of claim 1, further comprising sending an authentication request to an authentication server.

5. The method of claim 4, further comprising receiving an authentication key from the authentication server.

6. The method of claim 5, wherein the authentication key comprises a key exchange key (KEK).

7. The method of claim 1, wherein the first update request and the second update request comprise a request for changes to a key exchange key (KEK).

8. The method of claim 1, wherein the maximum update parameter comprises the maximum amount of time a node waits before sending the second update request.

9. The method of claim 1, wherein the first update request comprises a time unit that is less than the time indicated by the maximum update parameter.

10. The method of claim 1, wherein the first load data and the second load data comprise parameters that indicate the load the authenticating server was under for previous time units.

11. The method of claim 1, further comprising sending a third update request by the computing device at the termination of a second random delay that is different than the first random delay.

12. A computing device that is configured to determine a time delay for sending a key update request, the computer system comprising:
   a processor;
   memory in electronic communication with the processor;
   instructions stored in the memory, the instructions being executable to:
      send a first update request by the computing device at the termination of a first random delay that is determined at the computing device;
      receive a first load data at the computing device;
      send a second update request at the termination of a maximum update parameter;
      receive a second load data at the computing device;
      compare the first load data with the second load data; and
      adjust a next update time if the first load data is differs from the second load data.

13. The computing device of claim 12, wherein the maximum update parameter comprises a different delay than the first random delay if the first load data is different from the second load data.

14. The computing device of claim 12, wherein the first random delay comprises time delay indicating the time to wait before sending the first update request.

15. The computing device of claim 12, further comprising an authentication request being sent to an authentication server.

16. The computing device of claim 15, further comprising an authentication key being received from the authentication server.

17. The computing device of claim 1, wherein the authentication key comprises key exchange key (KEK).

18. The computing device of claim 12, wherein the first update reque and the second update request comprise a request for changes to the KEK a key exchange key (KEK).

19. A non-transitory computer-readable medium comprising executaF instructions for determining a time delay for sending a key update request, the instructions bein executable to:
- send a first update request by a computing device at the termination of a first random delay that is determined at the computing device;
- receive a first load data at the computing device;
- send a second update request at the termination of a maximum update parameter;
- receive a second load data at the computing device;
- compare the first load data with the second load data; and
- adjust a next update time if the first load data differs from the second load data.

20. The non-transitory computer-readable medium of claim 19, wherein the maximum update parameter comprises a different delay than the first random delay if the first load data is different from the second load data.

21. The non-transitory computer-readable medium of claim 19, wherein the first random delay comprises a time delay indicating the time to wait before sending the first update request.

* * * * *

UNITED STATES PATENT AND TRADEMARK OFFICE
CERTIFICATE OF CORRECTION

PATENT NO. : 8,588,420 B2  
APPLICATION NO. : 11/624551  
DATED : November 19, 2013  
INVENTOR(S) : W. Bryant Eastham et al.

Page 1 of 1

It is certified that error appears in the above-identified patent and that said Letters Patent is hereby corrected as shown below:

In the Claims

Column 12, line 66 claim 18, delete "reque and" and replace it with --request and--.

Column 12, line 67 claim 18, delete "to the KEK" and replace it with --to--.

Column 13, line 2 claim 19, delete "executaF instructions" and replace it with --executable instructions--.

Column 13, line 3 claim 19, delete "instructions bein" and replace it with --instructions being--.

Signed and Sealed this  
Sixth Day of May, 2014

Michelle K. Lee  
*Deputy Director of the United States Patent and Trademark Office*